US011924934B2

(12) United States Patent
Mohan et al.

(10) Patent No.: US 11,924,934 B2

(45) Date of Patent: Mar. 5, 2024

(54) DYNAMIC FILTERING OF DIMMABLE LED DRIVERS

(71) Applicant: ERP POWER, LLC, Moorpark, CA (US)

(72) Inventors: James H. Mohan, Valencia, CA (US); Erik E. Morales, Canoga Park, CA (US)

(73) Assignee: ERP POWER, LLC, Westlake Village, CA (US)

( * ) Notice: Subject to any disclaimer, the term of this patent is extended or adjusted under 35 U.S.C. 154(b) by 112 days.

(21) Appl. No.: 17/834,776

(22) Filed: Jun. 7, 2022

(65) Prior Publication Data

US 2022/0418060 A1 Dec. 29, 2022

Related U.S. Application Data

(60) Provisional application No. 63/215,762, filed on Jun. 28, 2021.

(51) Int. Cl.
*H05B 45/14* (2020.01)
*H05B 45/325* (2020.01)

(52) U.S. Cl.
CPC ........... *H05B 45/14* (2020.01); *H05B 45/325* (2020.01)

(58) Field of Classification Search
CPC .... H05B 45/14; H05B 45/325; H05B 45/382; H05B 45/59
See application file for complete search history.

(56) References Cited

FOREIGN PATENT DOCUMENTS

CN 105430812 A * 3/2016
CN 211429568 U * 9/2020
CN 212660353 U * 3/2021

* cited by examiner

*Primary Examiner* — Abdullah A Riyami
*Assistant Examiner* — Syed M Kaiser
(74) *Attorney, Agent, or Firm* — Lewis Roca Rothgerber Christie LLP

(57) ABSTRACT

A method of driving a light source by a light driver includes measuring a current output signal of the light driver, calculating a percent change in output signal, determining whether the percent change in output signal is greater than or equal to a first threshold, and in response to determining that the percent change in the output signal is greater than or equal to the first threshold, calculating a percent change in reference voltage based on a current reference voltage and a previous reference voltage, determining whether the percent change in reference voltage is less than a second threshold, and in response to determining that the percent change in reference voltage is less than the second threshold, deactivating filtering and averaging of a dimmer signal received from a dimmer for a period of time, and reactivating the filtering and the averaging of the dimmer signal.

20 Claims, 5 Drawing Sheets

DYNAMIC FILTERING OF DIMMABLE LED DRIVERS

CROSS-REFERENCE TO RELATED APPLICATION(S)

This application claims priority to and the benefit of U.S. Provisional Patent Application No. 63/215,762, filed in the United States Patent and Trademark Office on Jun. 28, 2021, the entire disclosure of which is incorporated by reference herein.

FIELD

Aspects of the present invention are related to light drivers for light sources.

BACKGROUND

A light emitting diode (LED) is an electronic device that converts electrical energy (commonly in the form of electrical current) into light. The light intensity of an LED is primarily based on the magnitude of the driving current. Given that an LED luminosity is very sensitive to drive current changes, in order to obtain a stable luminous output without flicker, it is desirable to drive LEDs by a constant-current source. As any input power ripple may induce an output voltage ripple and output current ripple, a feedback loop that measures the output of the converter may be used to implement ripple control and to adjust the output signal. However, filtering or sampling at the feedback loop may result in a slow response that cannot follow rapid drops in input voltage. As such, when a dimmer level suddenly drops, the LED driver may produce a noticeable and an undesirable stepped output that does not follow the change in the dimmer level.

The above information disclosed in this Background section is only for enhancement of understanding of the invention, and therefore it may contain information that does not form the prior art that is already known to a person of ordinary skill in the art.

SUMMARY

Aspects of embodiments of the present disclosure are directed to a light driver capable of providing smooth light output transitions while also capable of responding to fast dimmer setting changes. In some embodiments, the light driver is capable of selective filtering and averaging of a reference signal in the feedback loop of the light driver.

According to some embodiments of the present disclosure there is provided a method of driving a light source by a light driver, the method including: measuring a current output signal of the light driver; calculating a percent change in output signal based on the current output signal and a previous output signal; determining whether the percent change in output signal is greater than or equal to a first threshold; and in response to determining that the percent change in the output signal is greater than or equal to the first threshold, calculating a percent change in reference voltage based on a current reference voltage and a previous reference voltage; determining whether the percent change in reference voltage is less than a second threshold; and in response to determining that the percent change in reference voltage is less than the second threshold, deactivating filtering and averaging of a dimmer signal received from a dimmer for a period of time; and reactivating the filtering and the averaging of the dimmer signal.

In some embodiments, the reference voltage is a target signal to which the light driver is configured to regulate the output signal to.

In some embodiments, the method further includes: in response to determining that the percent change in output signal is less than the first threshold, monitoring the output signal of the light driver.

In some embodiments, the method further includes: in response to determining that the percent change in reference voltage is greater than or equal to the second threshold, monitoring the output signal of the light driver.

In some embodiments, the current output signal is a current load voltage of the light driver and the previous output signal is a previous load voltage of the light driver, and wherein the percent change in output signal is expressed as: $Vo_{PD}=100\times(Vo_{OLD}-Vo_{NEW})/Vo_{OLD}$, where $V_{PD}$ represents the percent change in output signal, $Vo_{OLD}$ represents the previous load voltage, and $Vo_{NEW}$ represents the current load voltage.

In some embodiments, the current output signal is a current load current of the light driver and the previous output signal is a previous load current of the light driver, and wherein the percent change in output signal is expressed as: $Io_{PD}=100\times(Io_{OLD}-Io_{NEW})/Io_{OLD}$, where $I_{PD}$ represents the percent change in output signal, $Io_{OLD}$ represents the previous load current, and $Io_{NEW}$ represents the current load current.

In some embodiments, the first threshold is ten percent, wherein the second threshold is five percent, and wherein the period of time is 100 ms to 500 ms.

In some embodiments, the percent change in reference voltage is expressed as: $Vref_{PD}=100\times(Vref_{OLD}-Vref_{NEW})/Vref_{OLD}$, where $Vref_{PD}$ represents the percent change in reference voltage, $Vref_{OLD}$ represents the previous reference voltage, and $Vref_{NEW}$ represents the current reference voltage.

In some embodiments, the method further includes: in response to the determining that the percent change in reference voltage is less than the second threshold: setting the current output signal as the previous output signal; and setting the current reference voltage as the previous reference voltage.

In some embodiments, the dimmer signal is a sampled PWM signal corresponding to a dimmer level of the dimmer, and the dimmer is phase-cut dimmer external to the light driver.

According to some embodiments of the present disclosure there is provided a light driver including: a converter configured to generate an output voltage based on a rectified input signal for driving a light source; and a processor configured to regulate the output voltage of the converter via a reference voltage, the processor being further configured to perform: measuring a current output signal of the light driver; calculating a percent change in output signal based on the current output signal and a previous output signal; determining whether the percent change in output signal is greater than or equal to a first threshold; and in response to determining that the percent change in the output signal is greater than or equal to the first threshold, calculating a percent change in the reference voltage based on a current reference voltage and a previous reference voltage; determining whether the percent change in the reference voltage is less than a second threshold; and in response to determining that the percent change in the reference voltage is less than the second threshold, deactivating filtering and averaging of a dimmer signal received from a dimmer for a period of time; and reactivating the filtering and the averaging of the dimmer signal.

In some embodiments, the reference voltage is a target signal to which the light driver is configured to regulate the output signal to.

In some embodiments, the light driver further includes: in response to determining that the percent change in output signal is less than the first threshold, monitoring the output signal of the light driver.

In some embodiments, the light driver further includes: in response to determining that the percent change in the reference voltage is greater than or equal to the second threshold, monitoring the output signal of the light driver.

In some embodiments, the current output signal is a current load voltage of the light driver and the previous output signal is a previous load voltage of the light driver, and the percent change in output signal is expressed as: $Vo_{PD}=100\times(Vo_{OLD}-Vo_{NEW})/Vo_{OLD}$, where $V_{PD}$ represents the percent change in output signal, $Vo_{OLD}$ represents the previous load voltage, and $Vo_{NEW}$ represents the current load voltage.

In some embodiments, the current output signal is a current load current of the light driver and the previous output signal is a previous load current of the light driver, and the percent change in output signal is expressed as: $Io_{PD}=100\times(Io_{OLD}-Io_{NEW})/Io_{OLD}$, where $I_{PD}$ represents the percent change in output signal, $Io_{OLD}$ represents the previous load current, and $Io_{NEW}$ represents the current load current.

In some embodiments, the first threshold is ten percent, the second threshold is five percent, and the period of time is 100 ms to 500 ms.

In some embodiments, the percent change in the reference voltage is expressed as: $Vref_{PD}=100\times(Vref_{OLD}-Vref_{NEW})/Vref_{OLD}$, where $Vref_{PD}$ represents the percent change in the reference voltage, $Vref_{OLD}$ represents the previous reference voltage, and $Vref_{NEW}$ represents the current reference voltage.

In some embodiments, the light driver further includes: in response to the determining that the percent change in the reference voltage is less than the second threshold: setting the current output signal as the previous output signal; and setting the current reference voltage as the previous reference voltage.

In some embodiments, the dimmer signal is a sampled PWM signal corresponding to a dimmer level of the dimmer, and the dimmer is phase-cut dimmer external to the light driver.

BRIEF DESCRIPTION OF THE DRAWINGS

The accompanying drawings, together with the specification, illustrate example embodiments of the present invention, and, together with the description, serve to explain the principles of the present invention.

DETAILED DESCRIPTION

The detailed description set forth below is intended as a description of example embodiments of a light driver capable of responding to rapid dimmer setting changes, provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

In the related art, an issue that may arise during normal operation of an LED driver is that when the output is quickly dimmed down to minimum by a phase-cut (e.g., TRIAC) dimmer, the LED driver cannot react quick enough to smoothly dim the output current that is supplied to the LED Load. This may be observed as a step in the output current of the driver as it dims from maximum to minimum. The step may hold for a short period of time before gradually decreasing to the minimum dim value due to filtering and averaging operation of LED driver, which causes a slow response by the LED driver output. This step in the light output may be visually observed and is undesirable.

According to some embodiments, the light driver monitors its output for rapid decreases or dives to the output current or voltage which are caused by a change to the phase-cut dimmer's conduction angle, and deactivates filtering and averaging so that the driver can quickly follow changes in the phase-cut dimmer's conduction angle; thus, eliminating any step in the output current and allowing for smoother dimming to the minimum output.

Figure 1:
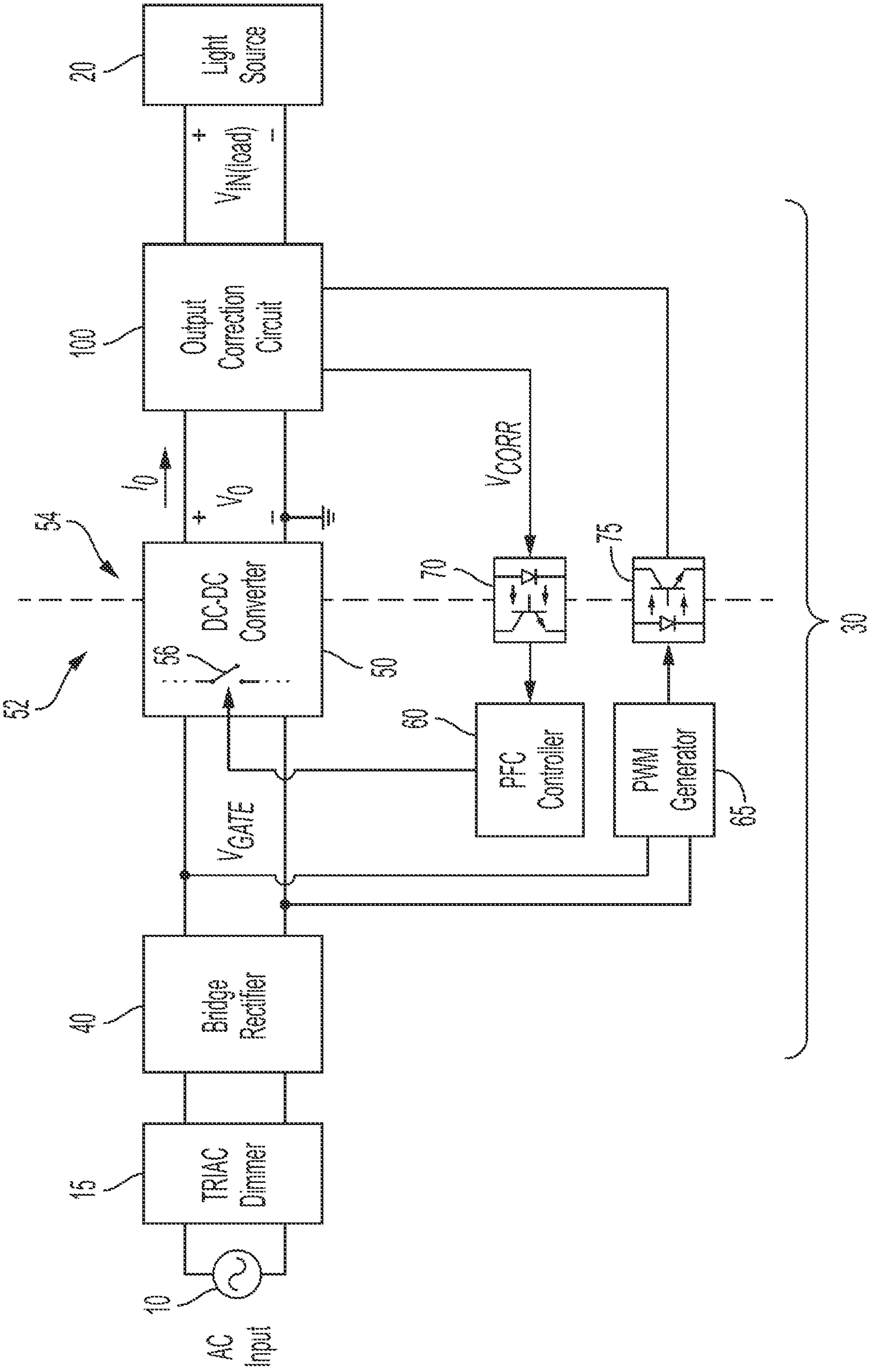
FIG. 1 illustrates a lighting system including a light driver having an output correction circuit, according to some example embodiments of the present disclosure.

FIG. 1 illustrates a lighting system 1 including a light driver 30 having an output correction circuit 100, according to some example embodiments of the present disclosure.

According to some embodiments, the lighting system 1 includes an input source 10, a light source 20, and a light driver 30 (e.g., a switched-mode power supply) for powering and controlling the brightness of the light source 20 based on the signal from the input source 10.

The input source 10 may include an alternating current (AC) power source that may operate at a voltage of 100 Vac, 120 Vac, 240 Vac, or 277 Vac, for example. The dimmer 15 is electrically powered by said AC power source. and modify (e.g., cut/chop a portion of) the input AC signal according to a dimmer level before sending it to the light driver 30, thus variably reducing the electrical power delivered to the light driver 30 and the light source 20. In some embodiments, the dimmer is a phase-cut dimmer, such as a TRIAC (triode for alternating current), ELV (electronic low voltage), or MLV (magnetic low voltage) dimmer, and may chop the front end or leading edge of the AC input signal. According to some examples, the dimmer interface may be a rocker interface, a tap interface, a slide interface, a rotary interface, or the like. A user may adjust the dimmer level by, for example, adjusting a position of a dimmer lever or a rotation of a rotary dimmer knob, or the like. The light source 20 may include one or more light-emitting-diodes (LEDs).

In some embodiments, the light driver 30 includes a rectifier 40, a converter 50, and an output correction circuit (e.g., a secondary-side output correction circuit) 100.

The rectifier 40 may provide a same polarity of output for either polarity of the AC signal from the input source 10. In some examples, the rectifier 40 may be a full-wave circuit using a center-tapped transformer, a full-wave bridge circuit with four diodes, a half-wave bridge circuit, or a multi-phase rectifier.

The converter (e.g., the DC-DC converter) 50 converts the rectified AC signal generated by the rectifier 40 into a drive signal for powering and controlling the brightness of the light source 20. The drive signal may depend on the type of the one or more LEDs of the light source 20. For example, when the one or more LEDs of the light source 20 are constant current LEDs the drive signal may be a variable voltage signal, and when the light source 20 requires constant voltage, the drive signal may be a variable current signal. In some embodiments, the converter 50 includes a boost converter for maintaining (or attempting to maintain) a constant DC bus voltage on its output while drawing a current that is in phase with and at the same frequency as the line voltage (by virtue of the power factor correction (PFC) controller 60). Another switched-mode converter (e.g., a transformer) inside the converter 50 produces the desired output voltage from the DC bus. The converter has a primary side 52 and a secondary side 54 that is electrically isolated from, and inductively/magnetically coupled to, the primary side 52. In some examples, the PFC controller 60 may be configured to improve (e.g., increase) the power factor of the load on the input source 10 and reduce the total harmonic distortions (THD) of the light driver 30. The PFC controller 60 may be external to the converter 50, as shown in FIG. 1, or may be internal to the converter 50.

According to some embodiments, the output correction circuit 100 monitors the output (e.g., the output current) of the converter 50 on the secondary side and issues a correction signal that is fed back into the primary side 52 of the light driver 30. The correction signal may be utilized by the PFC controller 60 to drive the main switch 56 within the converter 50, which determines the DC output level of the light driver 30.

In some examples, an optocoupler 70 communicates the control signal (also referred as a correction signal) from the output correction circuit 100 on the secondary side 54 to the primary side 52, while maintaining the electrical isolation between the two sides.

Figure 2:
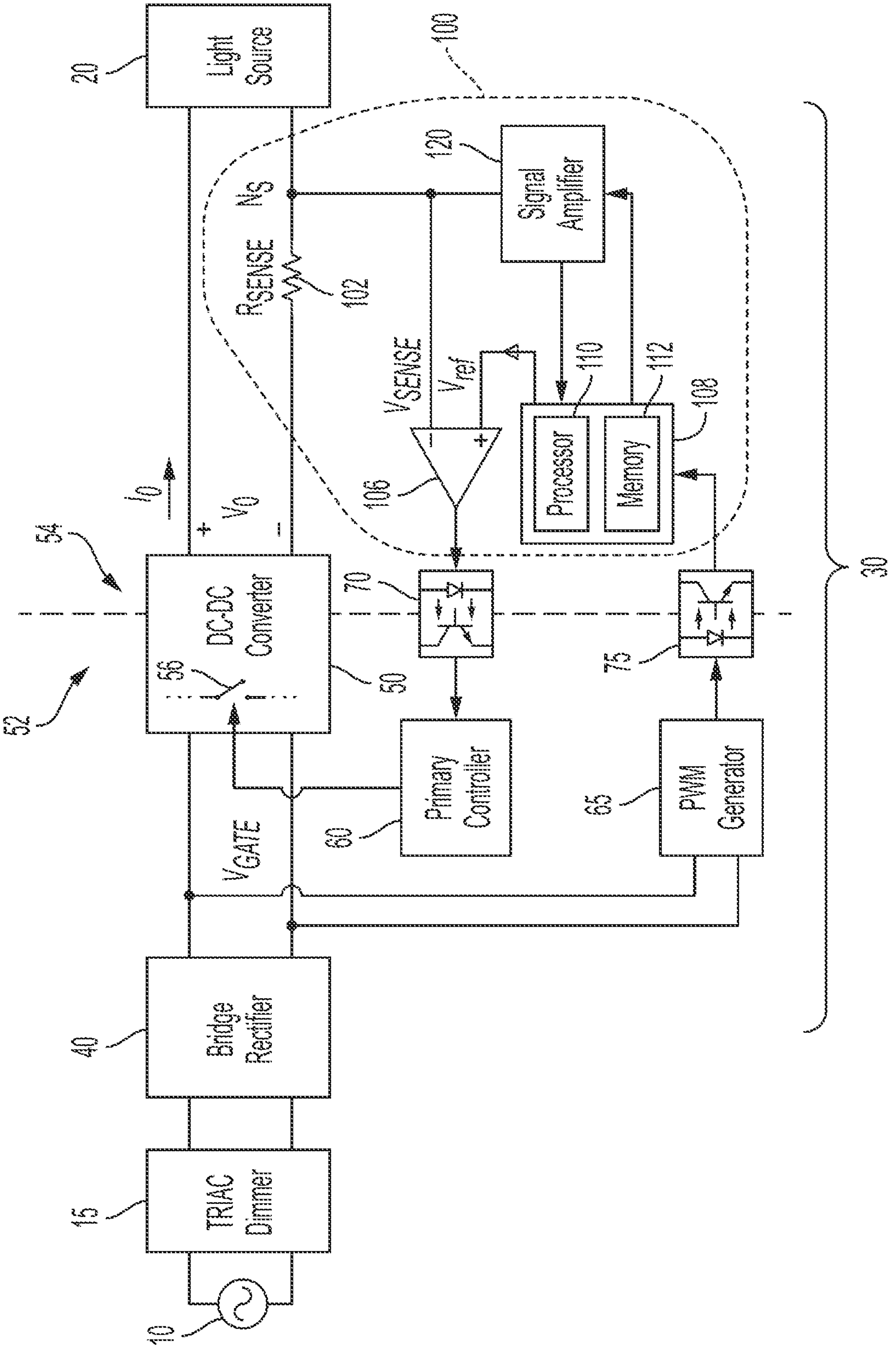
FIG. 2 is a schematic diagram illustrating the output correction circuit within the light driver, according to some example embodiments of the present disclosure.

FIG. 2 is a schematic diagram illustrating the output correction circuit 100 within the light driver 30, according to some example embodiments of the present disclosure.

According to some embodiments, the output correction circuit 100 is electrically coupled to the secondary side 54 of the converter 50 and electrically isolated from the primary side 52. The output correction circuit 100 measures the drive signal (e.g., drive current $I_{OUT}$) that is output by the converter 50 and generates a correction signal to dynamically control a DC-level of the drive current of the converter based on the measured drive current and a dimmer signal corresponding to a desired DC-level of the drive current. In some embodiments, the output correction circuit 100 includes a sense resistor 102, an error amplifier (e.g., an analog error amplifier) 106, and a reference generator 108, and a signal amplifier 120.

The sense resistor 102 is positioned between an output terminal (e.g., a reference/ground terminal) of the converter 50 and the light source 20 and is connected electrically in series with the light source 20 (e.g., at its negative input). In some examples, the sense resistor may be about 50 mΩ to about 1Ω. As the sense resistor 102 is in a current path of the drive current $I_{OUT}$, the voltage ($V_{SENSE}$) at an end of the resistor 102 that is connected to light source 20 at node Ns corresponds to the drive current $I_{OUT}$. For example, $$I_{OUT}=V_{SENSE}/R_{SENSE} \quad \text{Eq. (1)}$$

As the sense signal $V_{SENSE}$ may be too small to measure accurately, the signal amplifier 120 is utilized to amplify the sensed signal and to supply the amplified signal to the reference generator 108 for processing. The reference generator 108 then generates a reference signal (e.g., a reference current/voltage) Vref based on the amplified signal and a dimmer signal, which corresponds to a desired DC-level of the drive current. The error amplifier 106 also receives the sense signal $V_{SENSE}$ (e.g., at the negative input terminal of the error amplifier 106 via the fifth resistor $R_5$) in real-time and compares this signal to the reference signal and generates a correction signal (also referred to as a corrected control signal) $V_{CORR}$ based on a difference (e.g., error) between the sensed signal and the reference signal. The correction signal $V_{CORR}$ that is then generated by the error amplifier 106 is used by the PFC controller 60 to control the main switch 56 of the converter 50 (e.g., via a gate control signal $V_{GATE}$), which in turn controls/adjusts the voltage level of the converter output Vo. In some examples, the optocoupler 70 transmits the correction signal $V_{CORR}$ across the primary-secondary barrier to the PFC controller 60, while maintaining electrical isolation between the primary and secondary sides 52 and 54.

According to some embodiments, the reference generator 108 monitors (e.g., continually monitors) the amplified sensed signal and calculates an average of the amplified signal over a period of time to generate an average signal. The averaging period may be a value between about 100 ms to about 500 ms. The average signal may be a close approximation of the DC value of the drive current Io. The reference generator 108 then generates the reference signal based on a difference between the average signal and the dimmer signal, which corresponds to the desired target output current of the converter. For example, the reference generator 108 calculates the error/difference between the dimmer signal and the calculated mean value, and increase or decrease the reference signal proportional to the error. This allows the processor 110 to reduce the error to within an acceptable limit over time.

The reference generator 108 includes a processor (e.g., a programmable microprocessor) 110 and a memory (e.g., a storage memory) 112. The reference generator 108 is electrically coupled the output of the signal amplifier 120 and samples (e.g., measures) the amplified signal. The reference generator 108 converts the readings to digital binary form for further processing by the processor 110. The processor 110 calculates an average of the amplified signal, and uses this value and the dimmer signal to generate the reference signal for transmission to the error amplifier 106.

In some examples, the sense signal may have a magnitude (e.g., about 100 mV) that is much lower than that input range of the reference generator 108 (e.g., about 3.3 V), which may make it difficult for the reference generator 108 to accurately measure the changes in sensed signal. Accordingly, in some embodiments, the signal amplifier 120 amplifies the sensed signal so that the reference generator 108 can more accurately measure changes in the amplified signal.

According to some embodiments, the primary side of the light driver 30 includes a PWM generator 65 is configured to convert the modified AC input signal received from the bridge rectifier 40 into a pulse width modulation (PWM) signal for processing by the output correction circuit 100. The PWM generator 65 may include one or more comparators that compare the positive and negative swings of the incoming modified AC input signal with one or more set or predefined thresholds to generate a corresponding PWM signal. Thus, the PWM generator 65 maps the dimmed power of the modified AC input signal to pulse width modulations of the PWM signal. In some examples, the duty cycle of the PWM signal represents the dimmer level (i.e., the user setting at the dimmer 15). In some examples, a high value in the PWM signal may be about 3.3 V, which may correspond to a logic high (or a binary '1'), and a low value may be about 0 V, which may correspond to a logic low (or binary '0).

In some examples, the optocoupler 75 transmits the PWM signal across the primary-secondary barrier to the output correction circuit 100, while maintaining electrical isolation between the primary and secondary sides 52 and 54.

In some embodiments, the output correction circuit 100 is configured to measure (e.g., continuously measure) the duty cycle of the PWM signal and to generate a sequence of sample values (also referred to herein as a dimmer signal), which may correspond to the dimming levels of the dimmer 15 at a plurality of sample times. Each sample value corresponds to a new target setting that the light source 20 should output. The sampling frequency of the output correction circuit 100 may be significantly faster than the speed at which a user can change the dimmer level. For example, the sampling frequency may be about 12 kHz or higher.

The output correction circuit 100 detects changes in the dimmer level based on the sequence of samples, and processes (e.g., dynamically filters and averages) the sampled values to reduce or eliminate noise in the analog dimmer signal from the dimmer 15 that could otherwise cause flickering when driving the light source 20. The output correction circuit 100 determines the reference signal Vref sent to the error amplifier 106 based on the amplified signal and the processed samples.

The output of the converter 50 is determined based on the root-mean-square (RMS) AC voltage received from the rectifier 40, which sets the power limit that the light driver 30 can operate at, and the correction signal provided by the output correction circuit 100.

Figure 3A:
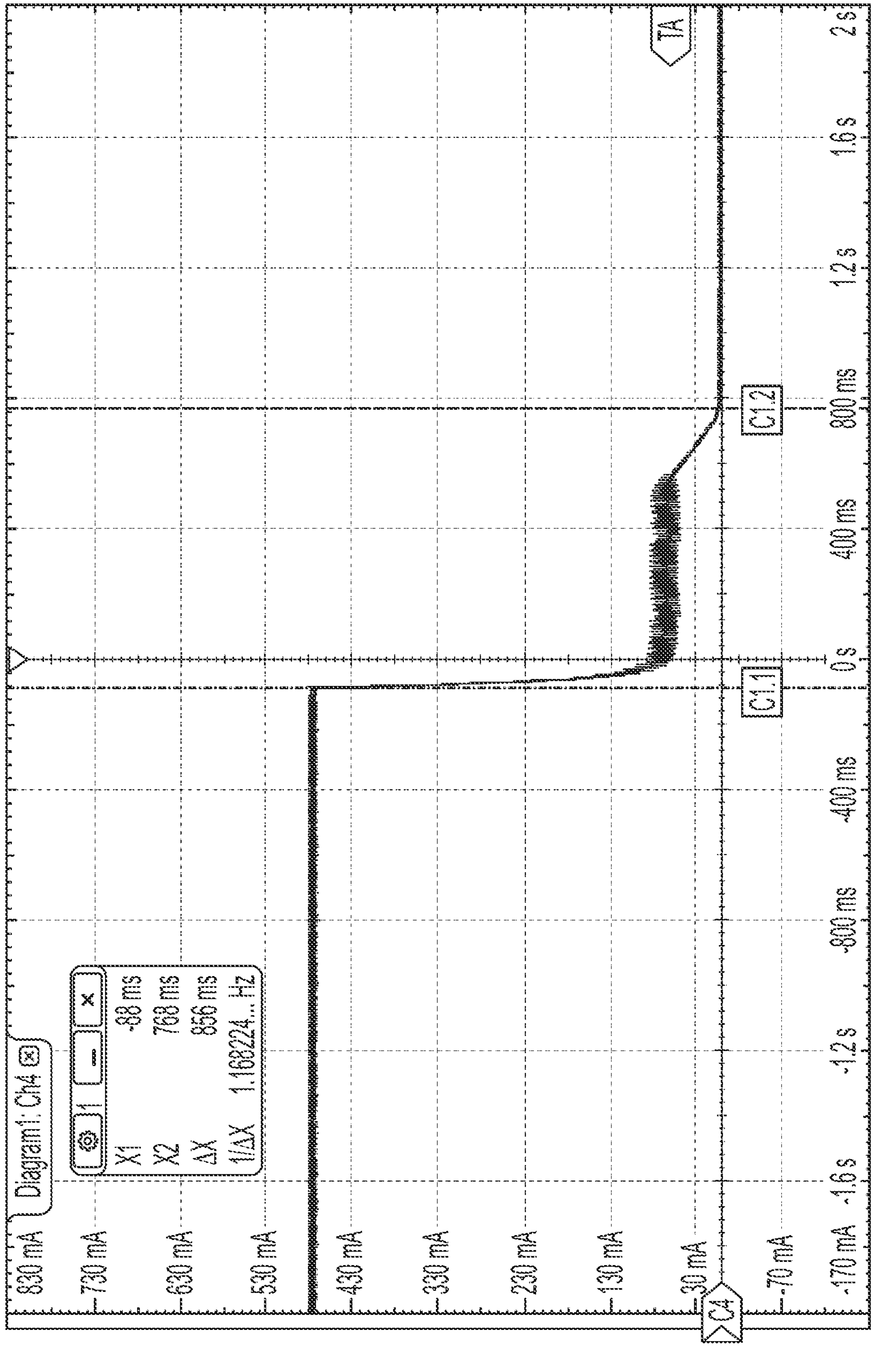
FIG. 3A illustrates the output current of a driver of the related art exhibiting a step-like drop in response to a rapid decrease in a TRIAC dimmer level.

When the TRIAC dimmer 15 is slammed down (e.g., moves down in under 500 ms), there is a rapid decrease in the RMS AC voltage received from the dimmer 15, which translates to a sharp decrease in power limit of the light driver 30. In the related art, because of the processing (e.g., filtering and averaging) of the samples by the output correction circuit, the response of the output correction circuit may be slow relative to the change in dimmer level (i.e., the target output of the driver may be higher than the actual output). Therefore, the output correction circuit of the related art cannot track the dimmer in real-time and the output of the converter exhibits a step-like drop until the output correction circuit of the related art catches up with the power limit function, after which the output gradually reduces to zero or close to zero. This is illustrated in FIG. 3A where the output current of a driver of the related art exhibits the step response to a rapid decrease in a TRIAC dimmer level. In the example of FIG. 3A, the TRIAC dimmer was slammed down in about 100 ms, which caused the RMS input voltage to the driver rapidly drop (e.g., from 120 V to 40V). The step highlights the slowness of the averaging of the output signal and the output voltage slew rate limit.

Figure 3B:
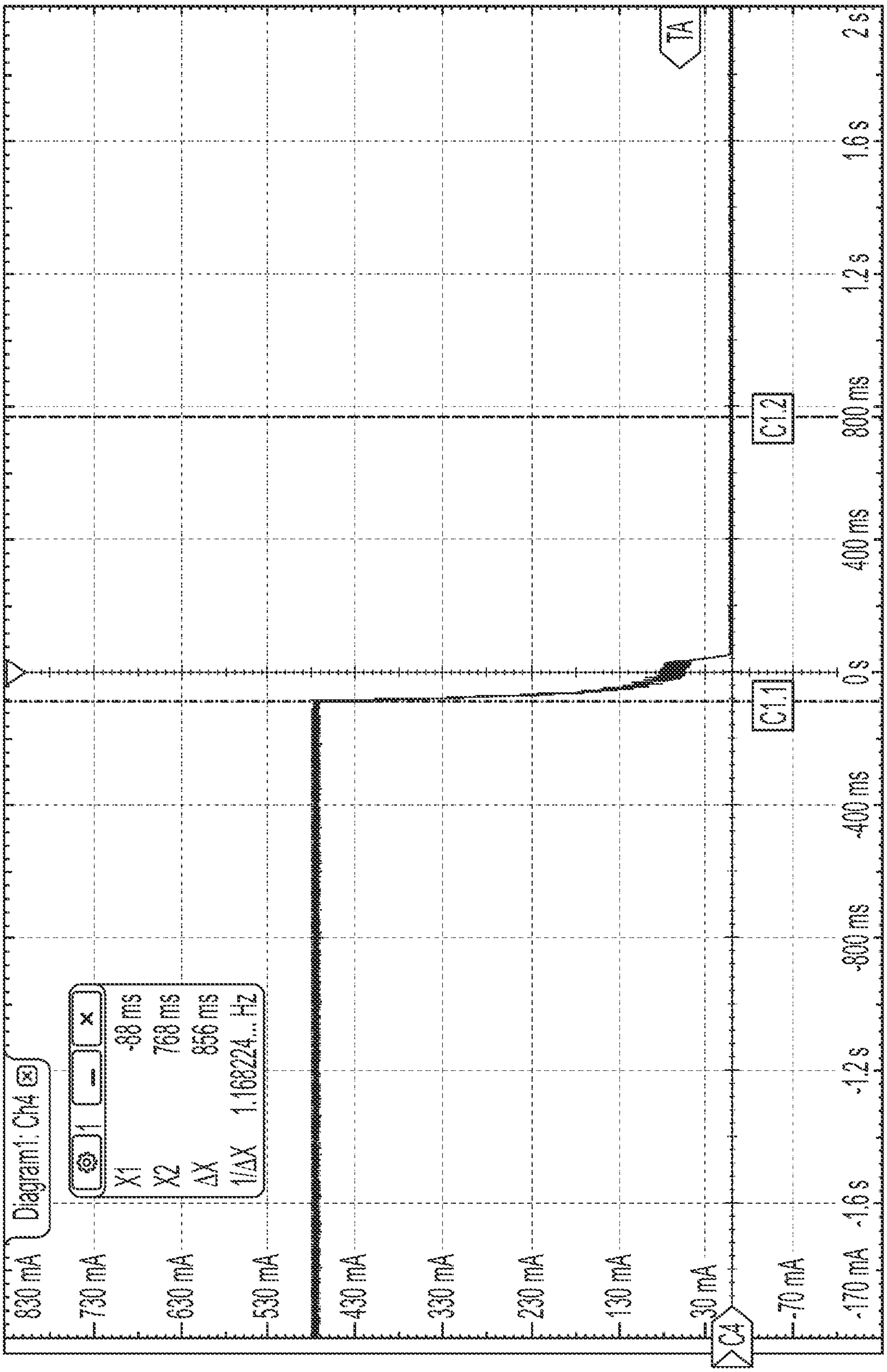
FIG. 3B illustrates the output current of the light driver with filtering and averaging deactivated in response to a rapid decrease in a TRIAC dimmer level, according to some embodiments of the present disclosure.

According to some embodiments, the output correction circuit 100 of the light driver 30 monitors the driver's output for rapid decreases or dives to the output current or voltage, which are caused by a change to the TRIAC dimmer's conduction angle. In some embodiments, the output correction circuit 100 deactivates filtering and averaging (which may occur over a 100 ms period) so that the light driver 30 can quickly follow changes in the TRIAC's conduction angle; thus, eliminating any step in the output current/voltage and allowing for smoother dimming to the minimum output. FIG. 3B illustrates the deactivation of filtering and averaging, which results in a narrower step than that illustrated in FIG. 3A (e.g., having a 50 ms step rather than the 900 ms of FIG. 3A) and the elimination of the sloped drop after the step in FIG. 3A.

Figure 4:
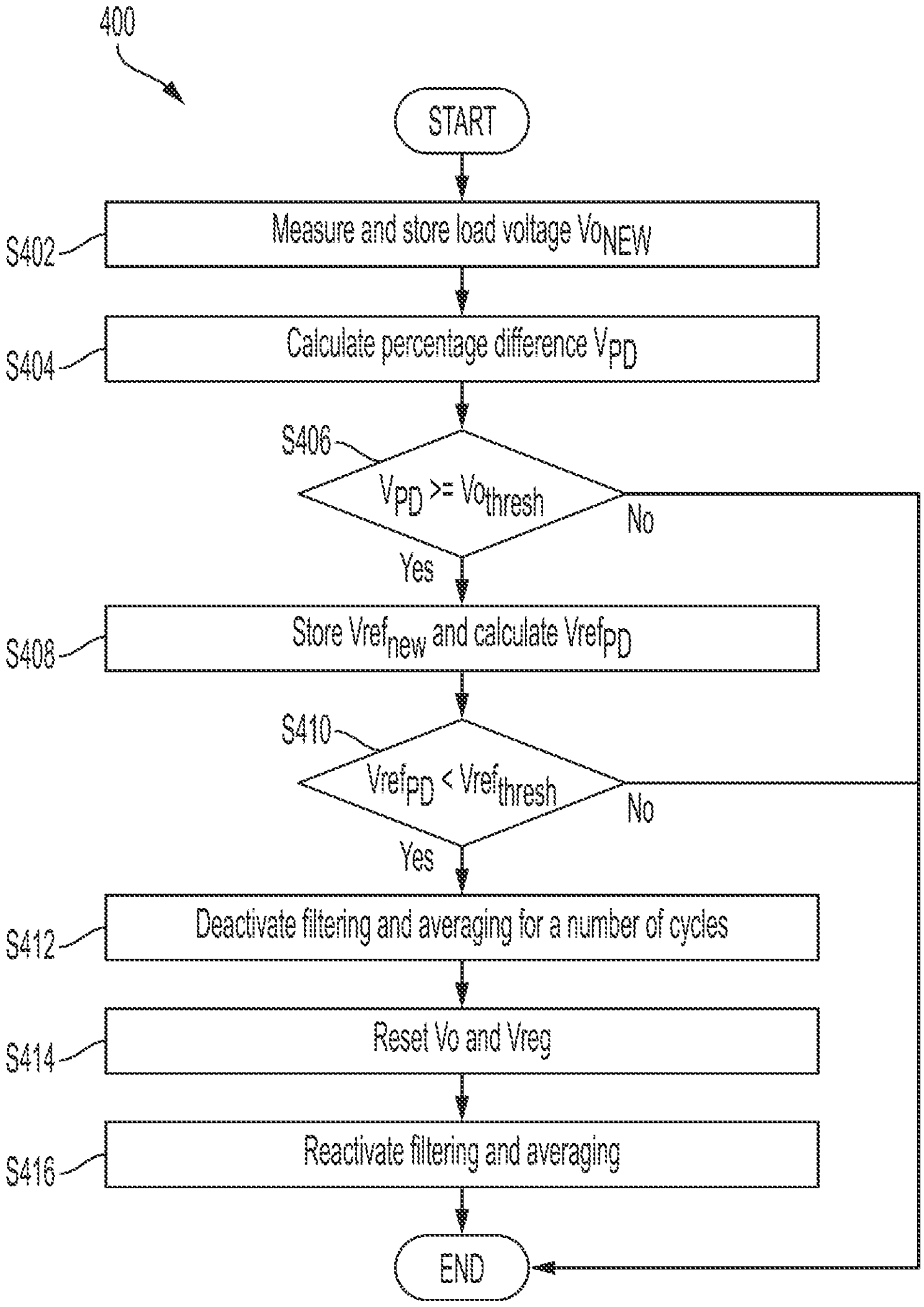
FIG. 4 illustrates a process of driving a light source to track very rapid drops in dimming level, according to some embodiments of the present disclosure.

FIG. 4 illustrates a process 400 of driving a light source to track very rapid drops in dimming level, according to some embodiments of the present disclosure.

According to some embodiments, the output correction circuit 100 detects events in which the output signal to the light source 20 suddenly dives down, and in response, quickly deactivates the filtering (e.g., dead-band filtering) and averaging of the dimmer samples (e.g., the TRIAC duty cycle). In some embodiments, the light driver 30 then follows the dimmer's duty cycle for a period (e.g., within one cycle) without filtering and averaging. As a result, the light driver 30 can dim from maximum to minimum more smoothly without experiencing the step caused due to filtering and averaging.

This process begins with the output correction circuit 100 (e.g., the processor 110) monitoring (e.g., measures/samples) the current output signal and storing the value in memory 112 (S402). The output correction circuit 100 calculates a percent change in the output signal based on the current/measured output signal and a previous output signal (S404).

In some embodiments, the light driver 30 monitors the output voltage of the converter 50, which is also referred as the load voltage, for sudden dives. In such embodiments, the output signal is the load voltage, and the output correction circuit 100 calculates a percent change $Vo_{PD}$ in the output signal/voltage based on the current/measured load voltage $Vo_{NEW}$ and a previous load voltage $Vo_{OLD}$. The percentage difference $Vo_{PD}$ between the measured load voltage $Vo_{NEW}$ and the previous value of the load voltage $Vo_{NEW}$ may be expressed as:

$$Vo_{PD}=100\times(Vo_{OLD}-Vo_{NEW})/Vo_{OLD} \quad \text{Eq. (1)}$$

In other embodiments, the light driver 30 monitors the output current of the converter 50, which is also referred as the load current, for sudden dives. In such embodiments, the output signal is the load current, and the output correction circuit 100 calculates a percent change $Io_{PD}$ in the output signal/current based on the current/measured load current $Io_{NEW}$ and a previous load current $Io_{OLD}$. The percentage difference $Io_{PD}$ between the measured load current $Io_{NEW}$ and the previous value of the load current $Io_{OLD}$ may be expressed as:

$$Io_{PD}=100\times(Io_{OLD}-Io_{NEW}/Io_{OLD} \quad \text{Eq. (2)}$$

The output correction circuit 100 then compares the percent change in the output signal with a first threshold (e.g., a voltage/current difference threshold) $Vo_{thresh}/Io_{thresh}$ (S406). When this percentage difference is less than the first threshold $Vo_{thresh}/Io_{thresh}$, the process 400 resets to continue monitoring the light driver's output. This may be because a difference of less than or equal to the first threshold $Vo_{thresh}/Io_{thresh}$ may not be a significant enough voltage/current drop in the load voltage/current to disable the filtering and averaging functions. The first threshold is set to exceed the normal 1-2% ripple that is observed at the output. For example, the first threshold may be set to 10%.

When the percentage difference $Vo_{PD}/Io_{PD}$ is greater than or equal to the first threshold $Vo_{thresh}/Io_{thresh}$, the output correction circuit 100 stores the current reference voltage $Vref_{NEW}$, and calculates a percent change in the reference voltage based on the current reference voltage $Vref_{NEW}$ and a previous reference voltage $Vref_{OLD}$ (S408). The percentage difference in the reference voltage may be expressed as:

$$Vref_{PD}=100\times(Vref_{OLD}-Vref_{NEW})/Vref_{OLD} \quad \text{Eq. (3)}$$

The output correction circuit 100 then compares the percent change in the reference voltage with a second threshold (e.g., a voltage difference threshold) $Vref_{thresh}$ (S410). When this voltage difference is greater than or equal the second threshold $Vref_{thresh}$, the output correction circuit 100 resets to continue monitoring the light driver's output. This may be because a difference in reference voltage greater than the second threshold signifies that the reference signal was adjusted by the processor 110 and not due to a change of the dimmer level. In some examples, the second threshold is set to 5%. When this voltage difference is less than the second threshold $Vref_{thresh}$, the output correction circuit 100 deactivates filtering and averaging of the dimmer signal (e.g., the sequence of sample values generated based on the PWM signal) received from the dimmer 15 for a period of time, which may be about 100 ms to about 500 ms long (S412). Here, the output correction circuit 100 determines a large change in the output voltage that does not coincide with a change in the reference voltage to be caused by an adjustment made to the dimmer level (e.g., to the TRIAC's conduction angle). In some examples, when Vref has not moved past the threshold $Vref_{thresh}$, filtering and averaging is deactivated for a few cycles and the TRIAC's conduction angle is observed over one cycle. Once the filtering and averaging has been deactivated, the light driver 30 may be able to quickly follow any changes to the dimmer setting (e.g., any changes to the TRIAC's conduction angle) when the driver's output is observed to rapidly dive down due to the dimmer 15 and not due to changes in the reference signal. For example, without filtering and averaging, the reference signal may capture the output signal of the converter 50 in about 15 ms, instead of the 100 ms that would be the case with averaging being activated.

After the period of time elapses, the output correction circuit 100 saves the current output signal and the current reference voltage as the previous output signal and the previous reference voltage (S414), and reactivates the filtering and averaging of the dimmer signal to resume normal operation (S416).

Accordingly, as described above, the light driver 30 is capable of reducing (e.g., minimizing) the step size observed in the output signal in response to a sudden dive in dimming level, which can reduce the undesirable effect observed in the LED drivers of the related art.

It will be understood that, although the terms "first", "second", "third", etc., may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section, without departing from the spirit and scope of the inventive concept.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

The light driver with the output correction circuit and/or any other relevant devices or components according to embodiments of the present invention described herein may be implemented by utilizing any suitable hardware, firmware (e.g., an application-specific integrated circuit), software, or a suitable combination of software, firmware, and hardware. For example, the various components of the independent multi-source display device may be formed on one integrated circuit (IC) chip or on separate IC chips. Further, the various components of the LED driver may be implemented on a flexible printed circuit film, a tape carrier package (TCP), a printed circuit board (PCB), or formed on the same substrate. Further, the various components of the LED driver may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer-readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

While this invention has been described in detail with particular references to illustrative embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method of driving a light source by a light driver, the method comprising:
measuring a current output signal of the light driver;
calculating a percent change in output signal based on the current output signal and a previous output signal;
determining whether the percent change in output signal is greater than or equal to a first threshold; and
in response to determining that the percent change in the output signal is greater than or equal to the first threshold,
calculating a percent change in reference voltage based on a current reference voltage and a previous reference voltage;
determining whether the percent change in reference voltage is less than a second threshold; and
in response to determining that the percent change in reference voltage is less than the second threshold,
deactivating filtering and averaging of a dimmer signal received from a dimmer for a period of time; and
reactivating the filtering and the averaging of the dimmer signal.

2. The method of claim 1, wherein the reference voltage is a target signal to which the light driver is configured to regulate the output signal to.

3. The method of claim 1, further comprising:
in response to determining that the percent change in output signal is less than the first threshold,
monitoring the output signal of the light driver.

4. The method of claim 1, further comprising:
in response to determining that the percent change in reference voltage is greater than or equal to the second threshold,
monitoring the output signal of the light driver.

5. The method of claim 1, wherein the current output signal is a current load voltage of the light driver and the previous output signal is a previous load voltage of the light driver, and
wherein the percent change in output signal is expressed as:

$$Vo_{PD}=100\times(Vo_{OLD}-Vo_{NEW})/Vo_{OLD}$$

where $V_{PD}$ represents the percent change in output signal, $Vo_{OLD}$ represents the previous load voltage, and $Vo_{NEW}$ represents the current load voltage.

6. The method of claim 1, wherein the current output signal is a current load current of the light driver and the previous output signal is a previous load current of the light driver, and
wherein the percent change in output signal is expressed as:

$$Io_{PD}=100\times(Io_{OLD}-Io_{NEW})/Io_{OLD}$$

where $I_{PD}$ represents the percent change in output signal, $Io_{OLD}$ represents the previous load current, and $Io_{NEW}$ represents the current load current.

7. The method of claim 1, wherein the first threshold is ten percent,
wherein the second threshold is five percent, and
wherein the period of time is 100 ms to 500 ms.

8. The method of claim 1, wherein the percent change in reference voltage is expressed as:

$$Vref_{PD}=100\times(Vref_{OLD}-Vref_{NEW})/Vref_{OLD}$$

where $Vref_{PD}$ represents the percent change in reference voltage, $Vref_{OLD}$ represents the previous reference voltage, and $Vref_{NEW}$ represents the current reference voltage.

9. The method of claim 1, further comprising:
in response to the determining that the percent change in reference voltage is less than the second threshold:
setting the current output signal as the previous output signal; and
setting the current reference voltage as the previous reference voltage.

10. The method of claim 1, wherein the dimmer signal is a sampled PWM signal corresponding to a dimmer level of the dimmer, and
wherein the dimmer is phase-cut dimmer external to the light driver.

11. A light driver comprising:
a converter configured to generate an output voltage based on a rectified input signal for driving a light source; and
a processor configured to regulate the output voltage of the converter via a reference voltage, the processor being further configured to perform:
measuring a current output signal of the light driver;
calculating a percent change in output signal based on the current output signal and a previous output signal;
determining whether the percent change in output signal is greater than or equal to a first threshold; and
in response to determining that the percent change in the output signal is greater than or equal to the first threshold,
calculating a percent change in the reference voltage based on a current reference voltage and a previous reference voltage;
determining whether the percent change in the reference voltage is less than a second threshold; and
in response to determining that the percent change in the reference voltage is less than the second threshold,
deactivating filtering and averaging of a dimmer signal received from a dimmer for a period of time; and
reactivating the filtering and the averaging of the dimmer signal.

12. The light driver of claim 11, wherein the reference voltage is a target signal to which the light driver is configured to regulate the output signal to.

13. The light driver of claim 11, further comprising:
in response to determining that the percent change in output signal is less than the first threshold,
monitoring the output signal of the light driver.

14. The light driver of claim 11, further comprising:
in response to determining that the percent change in the reference voltage is greater than or equal to the second threshold,
monitoring the output signal of the light driver.

15. The light driver of claim 11, wherein the current output signal is a current load voltage of the light driver and the previous output signal is a previous load voltage of the light driver, and
wherein the percent change in output signal is expressed as:

$$Vo_{PD}=100\times(Vo_{OLD}-Vo_{NEW})/Vo_{OLD}$$

where $V_{PD}$ represents the percent change in output signal, $Vo_{OLD}$ represents the previous load voltage, and $Vo_{NEW}$ represents the current load voltage.

16. The light driver of claim 11, wherein the current output signal is a current load current of the light driver and the previous output signal is a previous load current of the light driver, and wherein the percent change in output signal is expressed as:

$$Io_{PD}=100\times(Io_{OLD}-Io_{NEW})/Io_{OLD}$$

where $I_{PD}$ represents the percent change in output signal, $Io_{OLD}$ represents the previous load current, and $Io_{NEW}$ represents the current load current.

17. The light driver of claim 11, wherein the first threshold is ten percent, wherein the second threshold is five percent, and wherein the period of time is 100 ms to 500 ms.

18. The light driver of claim 11, wherein the percent change in the reference voltage is expressed as:

$$Vref_{PD}=100\times(Vref_{OLD}-Vref_{NEW})/Vref_{OLD}$$

where $Vref_{PD}$ represents the percent change in the reference voltage, $Vref_{OLD}$ represents the previous reference voltage, and $Vref_{NEW}$ represents the current reference voltage.

19. The light driver of claim 11, further comprising:

in response to the determining that the percent change in the reference voltage is less than the second threshold:

setting the current output signal as the previous output signal; and setting the current reference voltage as the previous reference voltage.

20. The light driver of claim 11, wherein the dimmer signal is a sampled PWM signal corresponding to a dimmer level of the dimmer, and wherein the dimmer is phase-cut dimmer external to the light driver.

* * * * *